US006678252B1

(12) United States Patent
Cansever

(10) Patent No.: US 6,678,252 B1
(45) Date of Patent: Jan. 13, 2004

(54) METHOD AND APPARATUS FOR DYNAMIC SOURCE ROUTING IN AD HOC WIRELESS NETWORKS

(75) Inventor: Derya H. Cansever, Southborough, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/428,502

(22) Filed: Oct. 28, 1999

(51) Int. Cl.$^7$ ............................................. H04L 12/50
(52) U.S. Cl. ...................... 370/253; 370/351; 370/400; 370/431; 370/468
(58) Field of Search ................................ 370/248, 252, 370/255, 328, 394, 395.41, 395.4, 253, 351, 400, 468, 431

(56) References Cited

U.S. PATENT DOCUMENTS

| | | | | |
|---|---|---|---|---|
| 5,729,531 | A | * | 3/1998 | Raith et al. |
| 5,987,011 | A | * | 11/1999 | Toh |
| 6,026,082 | A | * | 2/2000 | Astrin |
| 6,031,845 | A | * | 2/2000 | Walding |
| 6,041,359 | A | * | 3/2000 | Birdwell |
| 6,111,863 | A | * | 8/2000 | Rostoker et al. |
| 6,304,549 | B1 | * | 10/2001 | Srinivasan |
| 6,310,886 | B1 | * | 10/2001 | Barton |
| 6,349,094 | B1 | * | 2/2002 | Vastano et al. |
| 6,407,983 | B1 | * | 6/2002 | Zheng |
| 6,411,946 | B1 | * | 6/2002 | Chaudhuri |
| 6,438,141 | B1 | * | 8/2002 | Hanko et al. |

OTHER PUBLICATIONS

D. Cansever et al., Error Control and Resource Management in Mobile Ad–hoc Networks, Proc. of the PIMRC 1999.

(List continued on next page.)

*Primary Examiner*—Chi Pham
*Assistant Examiner*—Kamran Emdadi
(74) *Attorney, Agent, or Firm*—Leonard Charles Suchyta; James K. Weixel

(57) ABSTRACT

This invention addresses Media Access Control (MAC) routing protocol that accounts for QoS constraints for IP traffic in MANETs. Methods and systems consistent with this example use a decentralized algorithm that is run by the participating nodes with a minimal amount of control packets adding to network overhead. Methods and systems consistent with this invention calculate a maximum available bandwidth (MAB) metric used in the MAC protocol. The MAB, along with other information may be shared among nodes in the MANET. The shared information is also used in computing the traffic loads in other parts of the MANET, and in identifying the available links that could support the QoS requirements. Then, the information concerning available links is used in the MANET routing algorithm.

120 Claims, 8 Drawing Sheets

OTHER PUBLICATIONS

Abhay K. Parekh et al., A Generalizied Processor Sharing Approach to Flow Control in Integrated Services Networks: the Single–Node Case, IEEE/ACM Trans. On Networking, vol. I, No. 3, Jun. 1993.

V. Jacobson et al., An Expedited Forwarding PHB, IETF Draft, in Progress.

J. Heinanen et al., Assured Forwarding PHB, IETF Draft, in Progress.

V. Park et al., Temporally–Ordered Routing Algorithm (TORA) Version 1 Functional Specification, IETF Draft, in Progress.

Josh Broch et al., The Dynamic Source Routing Protocol for Mobile Ad Hoc Networks, IETF Draft, in Progress.

Charles E. Perkins et al., Ad Hoc On–Demand Distance Vector (ACDV) Routing IETF Draft, in Progress.

Piyush Gupta et al., The Capacity of Wireless Networks, submitted for publication; available at http://black.csl.u-iuc.edu/~prkumar.

P. Goyal, Start–time Fair Queuing: A Scheduling Algorithm for Integrated Services Packet Switching Networks, Proc. of ACM–SIGCOMM 96, Palo Alto, CA, Aug. 1996, pp. 157–168.

* cited by examiner

METHOD AND APPARATUS FOR DYNAMIC SOURCE ROUTING IN AD HOC WIRELESS NETWORKS

STATEMENT REGARDING FEDERALLY SPONSORED RESEARCH OR DEVELOPMENT

This invention was made with Government support under Grant No. DAAL 01-96-2-0002, Awarded by the U.S. Army Research Laboratory. The Government has certain rights in this invention.

BACKGROUND OF THE INVENTION

1. Field of the Invention

This invention relates to a data protocol in a computer network, and in particular to a Quality of Service (QoS) metric for a data protocol for transmitting Internet Protocol (IP) data subject to QoS constraints in a wireless mobile ad-hoc network.

2. Description of the Related Art

A collection of wireless mobile "nodes" that form the network without any fixed infrastructure or centralized administration is typically referred to as a wireless mobile "ad hoc" network (MANET). Such networks are useful for when it is economically or physically impractical to provide a fixed infrastructure, or when urgency does not allow installation of a fixed infrastructure. For example, a class of students may need to interact with their computers during a lecture; business associates may wish to share files impromptu at an airport terminal; rescue workers may need emergency communications after an earthquake; or, soldiers may need mobile communications on a battle field. In these situations, the computer communications network cannot be "terrestrial," i.e., it cannot have a fixed infrastructure or centralized administration; it must be a MANET.

Due to the limited range of the wireless transmission of each node in a MANET, a source node may need to enlist the aid of other intermediary transit nodes to forward data, usually grouped in "packets," to a destination node. A routing protocol finds a "path," "route," or "channel" for the data packets to travel from the source node to the destination node. FIG. 1 is a diagram of a conventional MANET. For example, a node C is not within a wireless transmission range 102 of a node A, and node A is not within a wireless transmission range 104 of node C. If node A and C want to exchange data packets, they may use node B as a transit node to forward data packets from node A to node C, and vice versa. It is practical to use transit node B because it is within both the wireless transmission ranges 102, 104 of node A and node C. Of course, the routing problem in a MANET may be more complicated than that in FIG. 1, due to mobile nodes and nonuniform propagation characteristics of wireless transmission.

Recently, MANETs have been supporting real-time Internet Protocol (IP) applications, such as telephony, and video streaming. Real-time IP applications (and any application that requires the transmission of time-sensitive data) need predictable network resources, to support predictable Quality of Service (QoS). QoS support entails providing an application with enough network resources so that it can function within acceptable performance limits. This support includes providing a minimum guaranteed bandwidth or special processing some packets. In IP telephony, for instance, the network must provide two "flows" of data—one flow in both directions between telephone users. The two flows must have a large enough bandwidth to carry digitized voice without introducing an annoying delay.

In both MANETs and terrestrial networks, however, data traffic congestion often frustrates providing sufficient network resources for QoS support for real-time applications. In a MANET, for instance, "physical layer" impairments that are caused by noisy, poor-quality radio channels result in insufficient network resources. In addition to the Gaussian background noise of terrestrial networks, MANETs also have impulsive noise, multipathing, signal fading, unintentional interference from other users of the channel, and intentional enemy jamming. These all increase noise and reduce the quality of radio channels in MANETs.

Solutions to physical layer impairments include providing stronger data coding, finding an alternate route, or increasing the transmission power level. These solutions, however, usually increase congestion in the network. For example, stronger codes add resiliency to a channel, but effectively reduce available bandwidth. Further, when the bit error rate caused by channel impairments reaches a certain threshold, coding methods alone are insufficient to overcome the impairment and an alternate path is needed. For example, such a threshold may be a bit error rate (BER) of $10^{-2}$ errors per second. Of course, finding an alternate route increases data congestion at other parts of the MANET. Lastly, increasing transmission power increases collisions and interference between nodes, which may reduce available bandwidth.

Another solution to the congestion problem is to over-engineer the network to provide more bandwidth. In a terrestrial network, over-engineering may include laying more coaxial or fiber optic cables. In a MANET, over-engineering may include increasing the frequency bands allocated to the MANET. It is expensive and inefficient to over-engineer a network, however, and this approach is not easily applied in MANETs.

Yet another solution to the congestion problem is to identify packets carrying real-time applications and provide them with special "priority" treatment. A widely known priority treatment is Differentiated Services (DS). Roughly speaking, DS marks special packets of data in a DS field in the packet. Nodes treat the specially marked packets according to an appropriate priority. DS does not identify individual flows, but provides a special treatment to an aggregate "class" of flows, as specified in the Per Hop Behavior (PHB) that corresponds to a particular value in the DS field.

PHBs use well-known packet scheduling algorithms such as weighted fair queuing, or start time queuing. These algorithms ensure that a minimum bandwidth is allocated to a certain class of traffic. Because DS does not differentiate between individual flows, the guaranteed bandwidth is allocated to an aggregate of flows, differentiated from other aggregated flows by a different DS field value. In the DS approach, a class of traffic obtains a given portion of the network resources. In one extreme case, however, the portion allocated to a specific class is 100%, and effectively nothing is gained from the DS approach. Further, there may be too many data packets for the allocated bandwidth in a given class. In this case, packets from the class would be subject to congestion within its allocated resources, similar to a single class best-effort system.

Many other solutions to solve the congestion problem assume that a particular node in the MANET is likely to serve as a transit node to a very large number of flows, similar to a "backbone" node in a high-speed terrestrial network. This assumption, however, is flawed because there usually is no identifiable backbone node in a MANET. MANET nodes, unlike terrestrial nodes, randomly assume transit responsibilities so that no one node is significantly more likely than another to serve as a transit node. Second, MANET nodes generally have a relatively low channel bit-rate that may saturate if acting as a backbone. Hence, no node in a MANET is likely to be a backbone node.

Most solutions to the congestion problem may also use "metrics" to measure conditions of the network in order to manage congestion. There are several known QoS metrics that relate to the performance requirements of real-time applications, including delay, jitter, and throughput. Routing algorithms use QoS metrics to find a path that satisfies the QoS requirements. Calculating a metric to find a route that satisfies multiple constraints, however, is a computationally difficult problem.

Thus, there is a need to overcome congestion within a class, provide QoS service, allocate network resources for identified flows, without generating significant overhead data. More specifically, there is a need for improved routing of IP packets with QoS constraints over MANETs with an improved QoS metric.

SUMMARY OF THE INVENTION

This summary and the following detailed description should not restrict the scope of the claimed invention. Both provide examples and explanations to enable others to practice the invention. The accompanying drawings, which form part of the detailed description, show several embodiments of the invention and, together with the description, explain the principles of the invention.

Methods and systems consistent with this invention manage data traffic in a network comprised of a plurality of nodes including a first node having at least one neighboring node. Such methods and systems determine a value indicative of a maximum unused bandwidth of the first node, receive from the at least one neighboring node data indicative of at least one maximum unused bandwidth of the at least one neighboring node, calculate a value indicative of a maximum available bandwidth of the first node from the value indicative of the maximum unused bandwidth of the first node and the received data indicative of the at least one maximum unused bandwidth, and allocate an air time for the first node to transmit data as a function of the maximum available bandwidth of the first node.

Such methods and systems use a decentralized algorithm that is run by the participating nodes in the MANET with a minimal amount of control packets contributing to network overhead.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

The following description of embodiments of this invention refers to the accompanying drawings. Where appropriate, the same reference numbers in different drawings refer to the same or similar elements.

Overview

Methods and systems consistent with this invention address a Media Access Control (MAC) routing protocol that accounts for QoS constraints for IP traffic in MANETs. Such methods and systems use a decentralized algorithm that is run by the participating nodes in the MANET with a minimal amount of control packets contributing to network overhead. The methods and systems calculate a maximum available bandwidth (MAB) metric used in the MAC protocol. The MAB, along with other information, may be shared among nodes in the MANET. The shared information is used to compute the traffic loads in other parts of the MANET, and to identify available links that could support requested QoS requirements.

Implementation

Methods and systems consistent with this invention calculate a value indicative of a "maximum available bandwidth" ("MAB") of a node in the MANET. The MAB may serve as a simple, but sufficient, metric for QoS requirement. The MAB metric accounts for a nodes used and unused resources, which may easily be communicated with other nodes in the network. Also, this metric approximates a circuit switched network, which has been supporting real time applications for decades.

Figure 1:
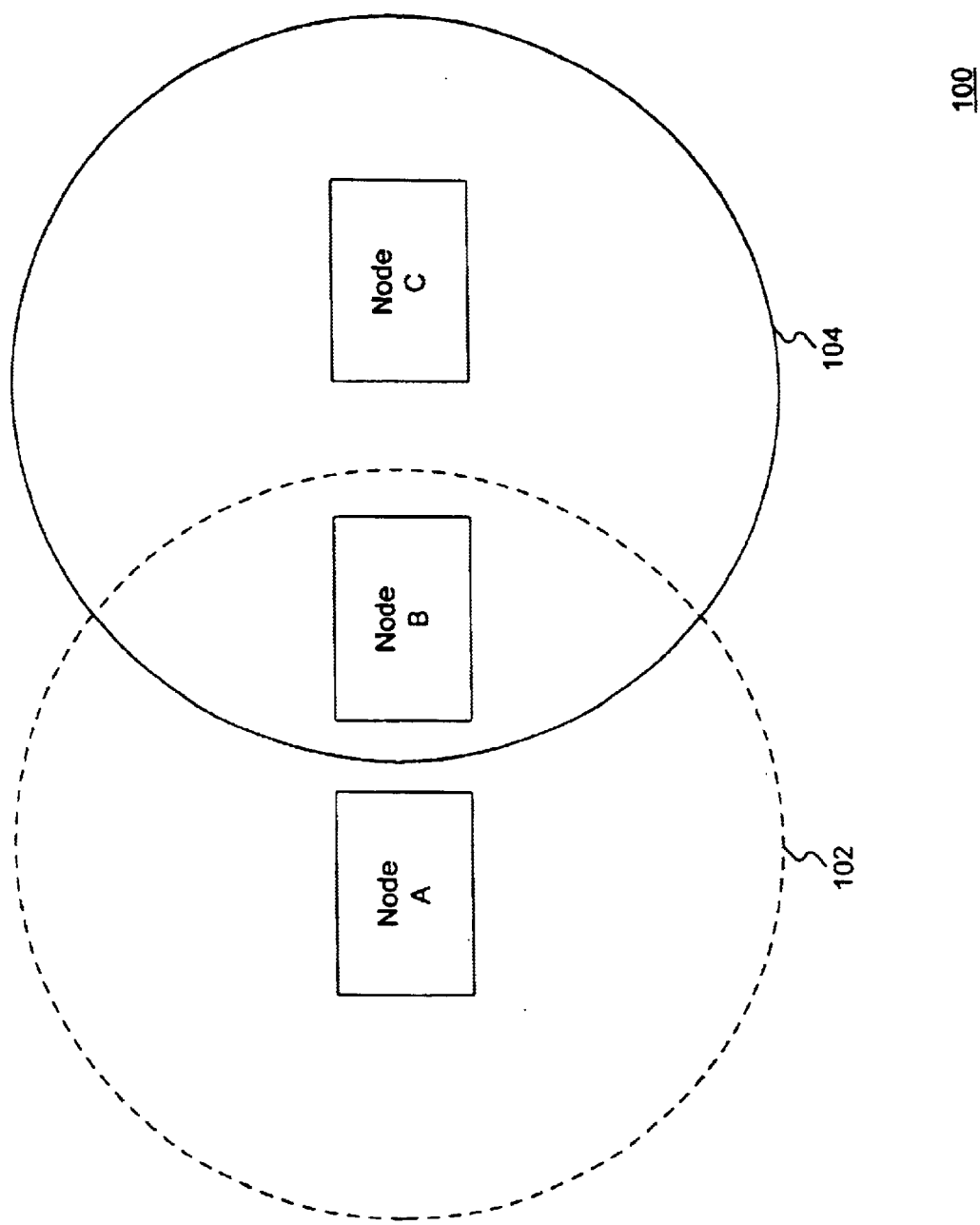
FIG. 1 is a diagram of a conventional mobile ad hoc network (MANET)
Figure 2:
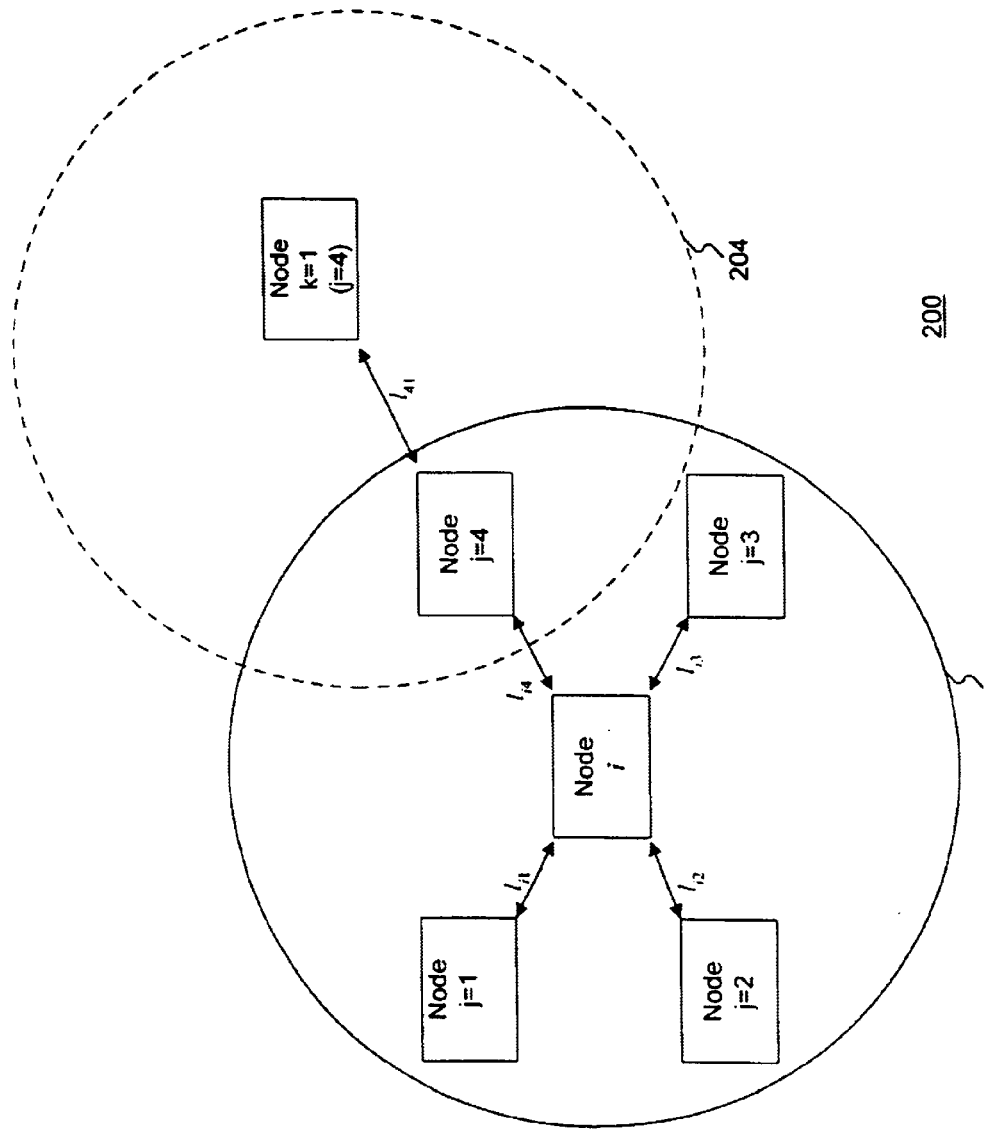
FIG. 2 is a diagram of a MANET, consistent with this invention, that calculates a maximum available bandwidth metric for Quality of Service requirements.

FIG. 2 is a diagram of a MANET 200, consistent with this invention, that calculates a MAB metric for Quality of Service (QoS) requirements. In FIG. 2, neighboring nodes j=1, j=2, j=3, and j=4 surround node i and are in a neighborhood 202 of node i. Neighborhood 202 of node i is defined as the set of nodes whose wireless transmission interferes with the transmission of node i when they transmit simultaneously. The MAB through node i depends on (1) the data traffic generated at node i; (2) the transit traffic through node i; and (3) the data traffic generated by nodes j=1–4 in neighborhood 202. The data traffic generated at node i and transit traffic through node i is described by the "maximum unused bandwidth" ("MUB"). The MAB is dependent at least on the traffic generated by nodes j=1–4 in neighborhood 202 because node i shares a common medium, i.e. the air waves, with neighboring nodes j=1–4. As described below, a node first calculates its MUB and, second, calculates its MAB.

First, methods and systems consistent with this invention determine a value indicative of the MUB of the node. Let $C_i$ denote the maximum bandwidth capacity of node i in bits per second. Let $l_{ij}$ denote the data traffic from node i to node j in bits per second. Therefore, $l_{ij}$ includes data traffic generated at node i, as well as transit data traffic through node i to node j. In FIG. 2, a line $l_{i1}$ represents data traffic from node i to node j=1, and a line $l_{i2}$ represents data traffic from node i to node j=2, etc. Methods and systems consistent with this invention may calculate a value indicative of the MUB as defined by:

$$MUB_i = C_i - \sum_j l_{ij},$$

where

∀j∈ neighborhood of node i.

A node may calculate its own MUB independent of information received from other nodes.

Second, methods and systems consistent with this invention calculate a value indicative of the MAB of the node. The MAB is calculated from the value indicative of MUB of the node and the received data indicative of the maximum unused bandwidths of neighboring nodes. For instance, methods and system systems consistent with this invention calculate a metric indicative of the maximum available bandwidth of node i that is defined by $$MAB_i = MUB_i - \sum_j \sum_k l_{jk},$$

where

∀j∈ neighborhood of node i, and

∀k∈ neighborhood of j.

Let $l_{jk}$ denote the data traffic from node j to node k in bits per second. Therefore, $l_{jk}$ includes data traffic generated at node j, as well as transit data traffic through node j to node k. After manipulating these two equations, the maximum available bandwidth of node i may be rewritten as $$MAB_i = MUB_i - \sum_j [C_j - MUB_j],$$

where

∀j∈ neighborhood of node i.

As evident from the above equation, each node calculates its own MAB, given the MUB and capacity C of neighboring nodes. For example, node i may calculate $MAB_i$ knowing $C_{j=1}$, $C_{j=2}$, $C_{j=3}$, $C_{j=4}$, $MUB_{j=1}$, $MUB_{j=2}$, $MUB_{j=3}$, and $MUB_j=4$. To this end, methods and systems consistent with this invention also broadcast data indicative of a maximum bandwidth capacity C and the MUB of the node to neighboring nodes. Further, methods and systems consistent with this invention receive, from neighboring nodes, data indicative of the maximum capacities and MUBs of neighboring nodes. In FIG. 2, for instance, node i may transmit $MUB_i$ and $C_i$ to nodes j=1–4. Further, for instance, node i may receive $MUB_{j=1}$, $MUB_{j=2}$, $MUB_{j=3}$, and $MUB_{j=4}$ from neighboring nodes j=1–4.

A node may infer the MABs of the nodes in its neighborhood if the node is further aware of the MUBs and capacities of the nodes in its neighbors's neighborhood. Therefore, methods and systems consistent with this example calculate values indicative of the MABs of neighboring nodes form the received data.

Alternatively, methods and systems consistent with this invention may broadcast data indicative of the MAB of the node to neighboring nodes. In this case, methods and systems consistent with this invention also receive data indicative of the MAB from the neighboring nodes. Because nodes are aware of the traffic demands, i.e. MABs, of neighbors, it is possible to implement a decentralized algorithm that allocates network resources.

Methods and systems consistent with this invention use the MAB metric with any network routing protocol such as a MAC protocol that supports "regulated" and "random" access to the media. Random access may occur at predetermined time intervals and a minimum bandwidth may be allocated for this function, such as 10%. Random access may be implemented by a well-known standard such as CDMA-CD, as defined in IEEE 802.11. The MAC protocol typically transmits best effort traffic during the random period. Methods and systems consistent with this invention may also broadcast data indicative of the MUB or MAB during the random access period of the protocol.

The MAC protocol defines the regulated access period as a "cycle," and divides the cycle into time slots. The number of time slots may decrease or increase in proportion to the total traffic in the neighborhood. At the beginning of each cycle, each node (aware of the MABs, i.e. traffic demands, of neighboring nodes) runs a resource allocation algorithm. The resource allocation algorithm allocates a number of time slots to the node for broadcasting data, i.e. it allocates "air time." For example, methods and systems consistent with this invention may allocate the slots in proportion to the declared demands among the nodes. More specifically, methods and systems consistent with this invention may allocate air time for the node to transmit data as a function of the maximum available bandwidth of the and on the one or more maximum available bandwidths of the one or more neighboring nodes. Further, methods and systems consistent with this invention may allocate air time in proportion to the maximum bandwidth capacity of the node minus the maximum available bandwidth of the node.

Next, the node may determine the order that the node and neighboring nodes should transmit to avoid collisions. The node may determine the order by the IP addresses, which the nodes may broadcast with the MUB data. For fairness, the order may rotate at the end of each cycle. All the nodes are preferably synchronized. Thus, all nodes preferably run the same allocation and order algorithm with identical information to determine air time and order.

After the air time and order are determined, each node runs any well-known packet scheduling algorithm to broadcast data during its allocated air time. Methods and systems consistent with this invention broadcast data during the air time according to a packet scheduling algorithm. Using the packet scheduling algorithm, a node may allocate the flows that it supports among its allocated time slots.

After nodes broadcast data in the cycle, the random period may repeat. At this time, new nodes in the neighborhood broadcasts data indicative of their MABs, MUB, etc. Methods and systems consistent with this invention may broadcast the MUB only when the MUB of the node changes. An existing node in the neighborhood broadcasts new traffic demand information when there is a change in its MAB, or when it cannot support an established flow. When a transit node realizes that it cannot support a QoS requirement for a flow, it informs the Source node. If the transit node cannot inform the source node, higher layer protocols may inform the source node. The updated traffic information (MABs, etc.) is used for the following Cycle.

Figure 3:
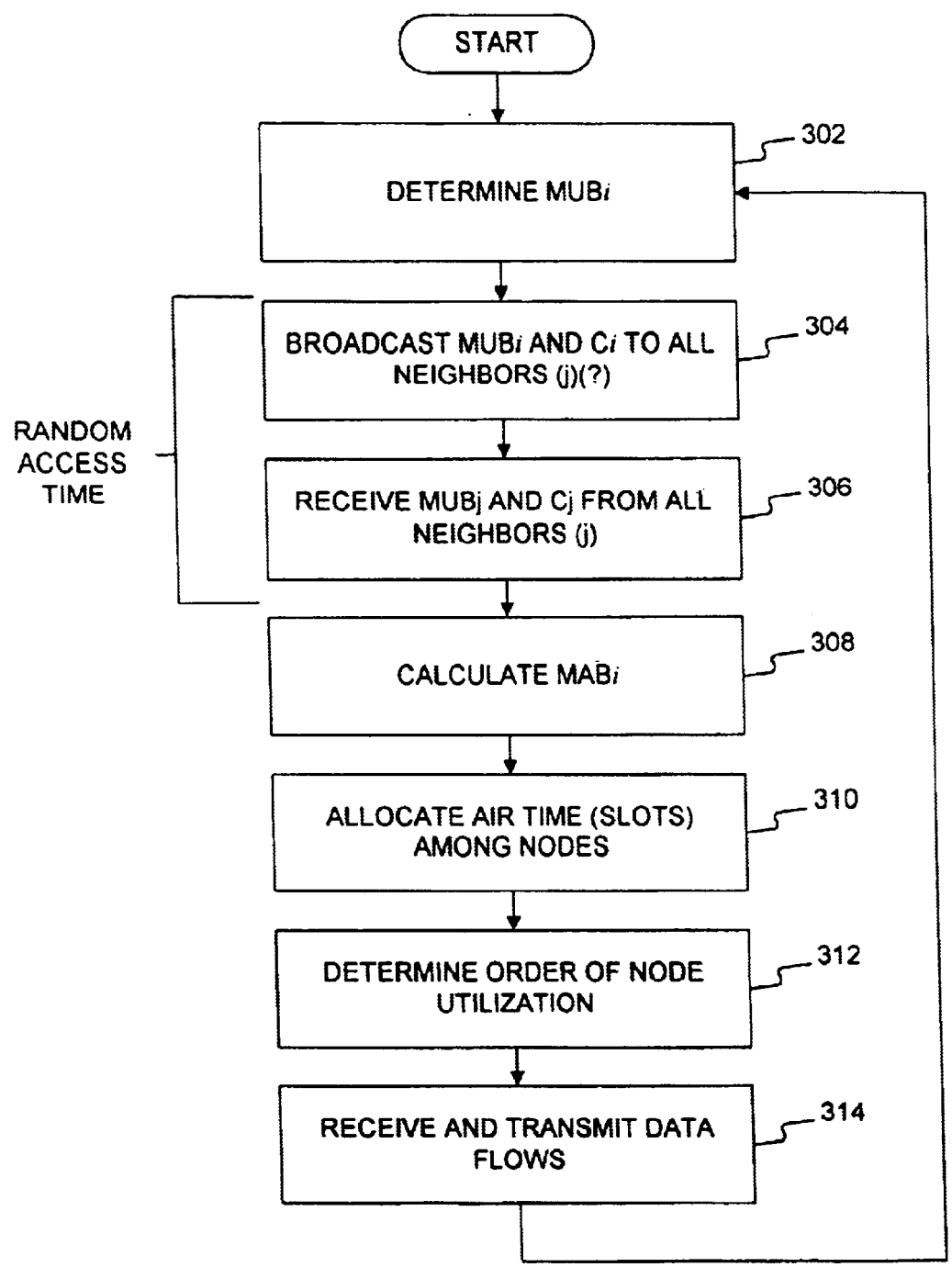
FIG. 3 is a flow chart of a method, consistent with this invention, for allocating resources in the MANET of FIG. 2.

FIG. 3 is a flow chart for a method, consistent with this invention, summarizing the allocation resources in MANET 200. First, node i determines its own $MUB_i$ (step 302). Then node i broadcasts $MUB_i$ to its neighborhood 202 (step 304). Node i then receives the MUBs ($MUB_{j=1}$, $MUB_{j=2}$, $MUB_{j=3}$, $MUB_{j=4}$) of nodes j=1–4 in neighborhood 202 (step 306). The broadcasting and receiving takes place during the random access period. At this point, node i has the information needs to calculate $MAB_i$ (step 308). Node i may also calculate the MABs ($MAB_j$) of nodes j=1–4 in its neighborhood 202 (not shown). Calculating or determining the MABs of all the nodes in its neighborhood requires receiving extra data form nodes j=1–4 as described above (step notshown). Node i may then allocate air time among itself and nodes j=1–4 in neighborhood 202 (step 310). Nodes j=1–4 in neighborhood 202 perform similar calculations and allocate air time similarly. Node i then determines the order of utilization among itself and neighborhood nodes j=1–4 (step 312). Again, nodes j=1–4 in neighborhood 202 perform similar calculations and determine similar order of utilization. At this point, node i, and nodes j=1–4 in neighborhood 202 transmit data at the appropriate time.

A node may terminate, generate, or relay flows, as part of a routing algorithm. The MAB metric simplifies QoS routing in MANETs by using well-known on-demand route creation techniques, such as Connection Admission Control (CAC). For example, methods and systems consistent with this invention may use the MAB metric in conjunction with a Query or Route Request packet, which is often used to initially identify a path from a source to a destination node. In this example, the source node indicates a requested bandwidth for a flow in the Route Request packet. A node that receives the Route Request packet compares the requested bandwidth to its MAB. If the requested bandwidth is less than or equal to its MAB, the receiving node grants the request and transmit the Route Request packet to the next node as specified in a routing algorithm. If the requested bandwidth is greater than the receiving node may deny the request.

When the request is denied, the destination node may have other paths from the source node to the destination node that may fulfill the QoS requirement specified in the Route Request packet. Among this list of paths, the destination node selects the shortest path, and transmits this information in a Route Reply packet back to the source node. If the source node does not receive a Reply packet within a specified period of time, it re-issues the Route Request packet, possibly with a different QoS request. Of course, route requests that correspond to best effort data traffic is not rejected due to insufficient MAB.

Figure 4:
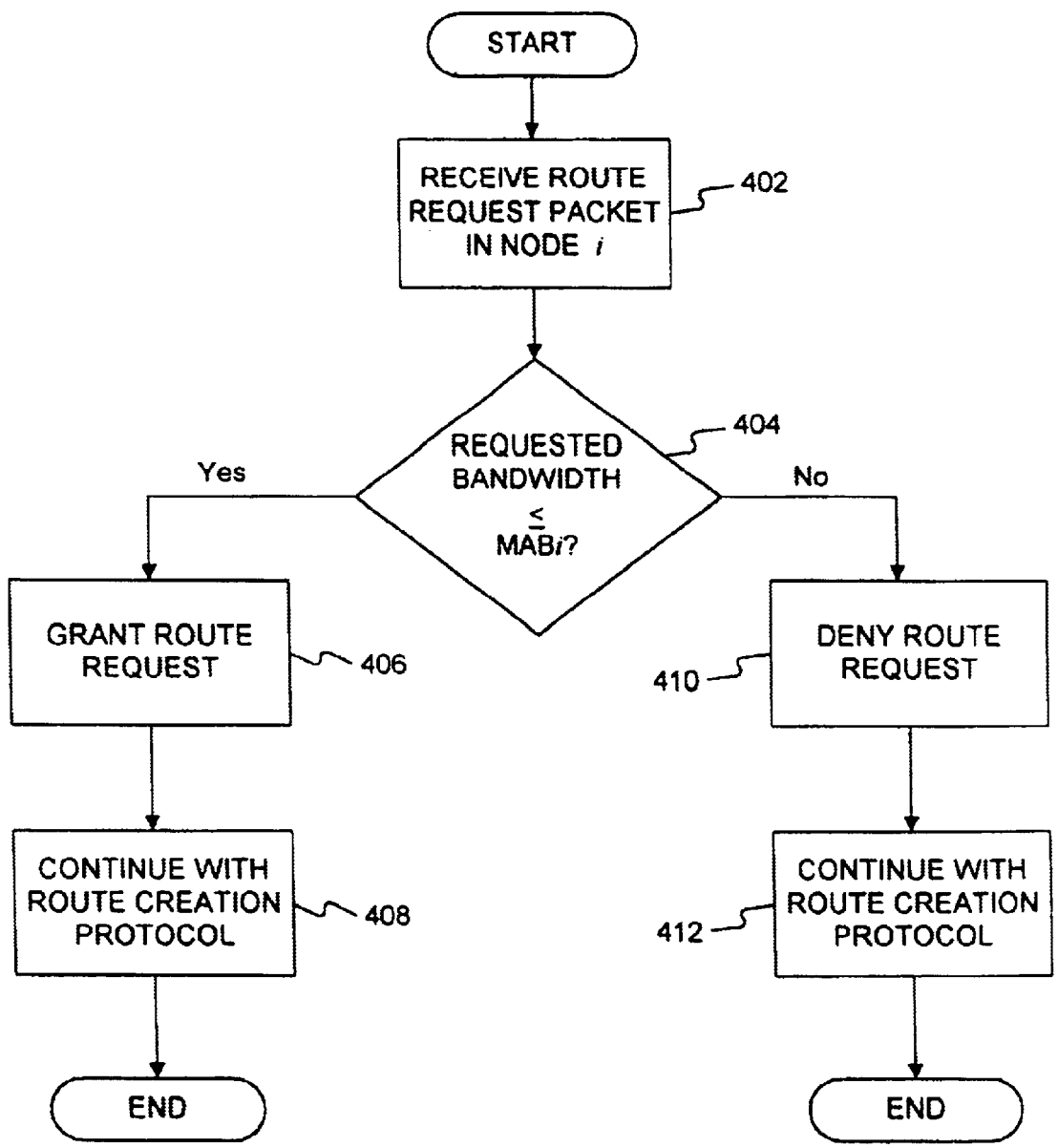
FIG. 4 is a flow chart of a method, consistent with this invention, for requesting bandwidth for a flow in MANET of FIG. 2.

FIG. 4 is a flow chart for a method, consistent with this invention, summarizing the request of bandwidth for a flow in MANET 200. First, node i receives a Route Request packet (step 402). Then, node i compares the requested bandwidth to its $MAB_i$ (step 404). If the requested bandwidth is less than or equal to $MAB_i$ (step 404), then the route request is granted (step 406) and the route creation protocol continues (step 408) If the requested bandwidth is greater to $MAB_i$ (step 404), then the route request is denied (step 410) and the route creation protocol continues (step 412).

When the Route Reply packet successfully traverses the nodes specified in the packet, it reserves the requested bandwidth in both directions, unless the packet indicates otherwise. If the source node needs a different bandwidth in each direction, it indicates this in the Route Request packet. In this case, the transit node considers the larger of the requested bandwidths, and the reservation is made accordingly.

The MANET routing algorithm maintains routes and adjusts topology. When the path for a flow becomes unusable (due to node mobility, etc.) a new path is established. For example, a node may release resources reserved for a flow if the node does not receive any packet from that flow within a predetermined period of time. This saves network resources and allows new flows to be established. One possible way for a node to identify a flow is with a source IP address, a destination IP address, a DS field that are in the data packets. If the DS field is used, a specific value of the DS field may indicate that a packet is to receive a special treatment.

Figure 5:
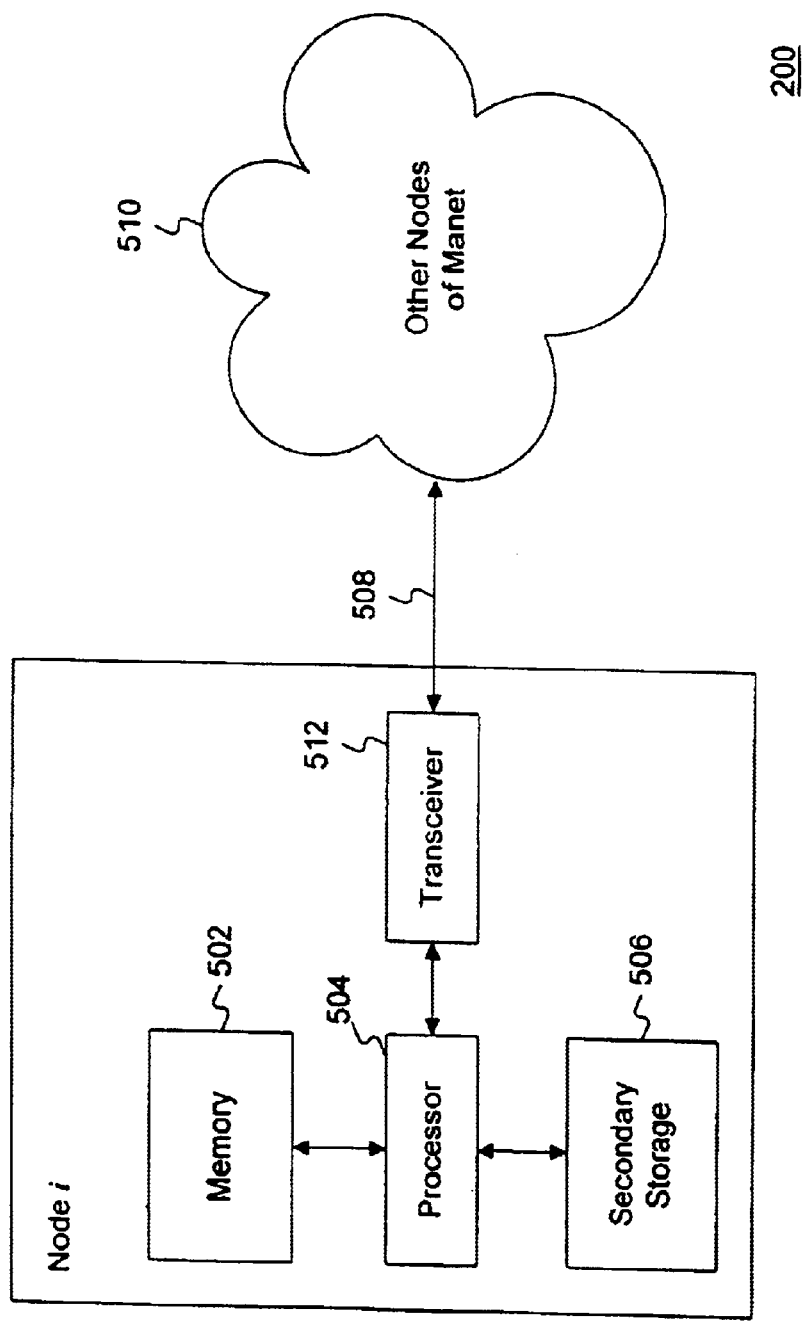
FIG. 5 is a block diagram, consistent with this invention, of a node in the MANET of FIG. 2.

FIG. 5 is a block diagram, consistent with this invention, of a node in MANET 200. Node i comprises a memory 502, a processor 504, a transmitter/receiver 508, and a secondary storage device 506. Transceiver 512 receives data indicative of the MUBs from neighboring nodes in MANET 200 via wireless channel 508. Transceiver 512 may broadcasts data indicative of the MUB of node i to neighboring nodes. Memory 502 contains a program for determining the value indicative of the MUB of node i and calculating a value indicative of the MAB of node i from the value indicative of the MAB of node i and the received data indicative of the MUBs of neighboring nodes. Processor 504 may run the program in memory 504. Secondary storage device 506 is a computer readable medium capable of storing the program, as well as data related to the program.

A MAC protocol, consistent with this invention, will support regulated, i.e., QoS aware, as well as random access to the media. The random access algorithm will follow a standard mechanism, such as CDMA-CD, as defined in the IEEE 802.11 Protocol. Using the random access mechanism, or by piggybacking with other data, all the nodes will broadcast information that indicates the traffic they intend to transmit. Once the nodes are aware of their neighbors' traffic demands, it is possible to implement a distributed protocol that allocates the "air time" among the nodes in their neighborhood.

Figure 6:
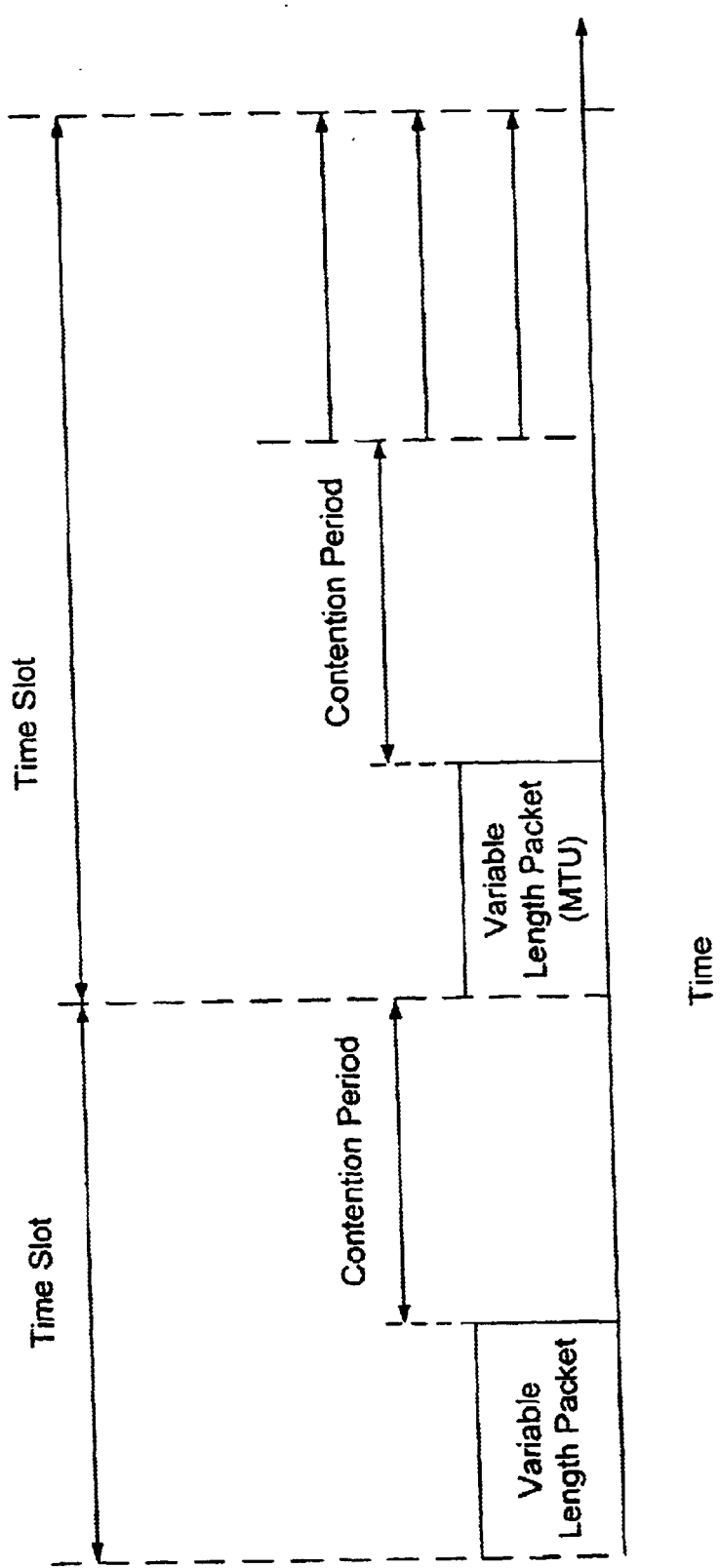
FIG. 6 is a diagram of a time slot in a distributed MAC protocol consistent with this invention.

FIG. 6 is a diagram of a time slot in a distributed MAC protocol consistent with this invention. A cycle consists of at most M time slots. A time slot is a fixed period of time, which is larger than the time necessary to transmit the Maximum Transmission Unit (MTU) in the network. Time slot as defined here is similar to the Contention Free Repetition Interval defined in the IEEE 802.11 Standard. In essence, the size of the time slot determines the length of the contention period. FIG. 6 illustrates a time slot consistent with this invention.

A time slot is pre-allocated to a node, which is allowed to transmit a single packet without any contention. Such packets contain a special marker, which also marks the beginning of the time slot. It is possible that during a contention period, the completion of the last packet's transmission may exceed the end of the time slot. In this case, the beginning of the next time slot will be delayed until the completion of the transmission, and the ensuing contention time will be shortened by the same amount. In addition, the contention-free packet at the last time slot of a cycle will contain another marker, so that a node that arrives to a neighborhood can synchronize with the operation of the distributed protocol. At the beginning of a cycle, each node is aware of all the neighbors' traffic demands, and participates in a distributed protocol that allocates the time slots among the neighbors in accordance with their respective demands. The MAC protocol determines the order and the number of time slots allocated to each node during a cycle.

Each node runs the distributed MAC protocol, based on the packets it has in its buffers, and the information it has received from its neighbors. The MAC protocol extends the Start Time Fair Queuing algorithm (STQ) to the distributed wireless environment.

Node j may generate a packet i that belongs to a flow f. The packet i may be denoted as $p_f^i$. On arrival of the packet in the node's transmit buffer, methods and systems consistent with this invention associate the packet $p_f^i$ with a Start Tag $S^j(p_f^i)$, which is computed as:

$S^j(p_f^i) = \text{Max}\{v^j[A(p_f^i)], F(p_f^{i-1})\}$, where $j \geq 1$.

Virtual time is denoted as $v^j( )$, and the arrival time of the packet $p_f^i$ is denoted as $A( )$. The Finish Tag of packet $p_f^i$, denoted as $F^j(p_f^i)$, is defined as:

$$F^j(p_f^i) = S^j(p_f^i) + \frac{l_f^i}{\phi_f^j}.$$

The symbol $l_f^i$ denotes the length of packet $p_f^i$, and the symbol $\phi_f^j$ denotes the share of the link that node j assigns to flow f, which is an estimate of the bandwidth required to support that flow. The system virtual time is defined as the Start Tag $S^j(p_f^i)$ of the packet that is being transmitted, if there is such a packet. If the network is idle in the neighborhood, then the system virtual time is defined as the maximum of the finish tags assigned to any packet that has completed service by that time.

Figure 7A:
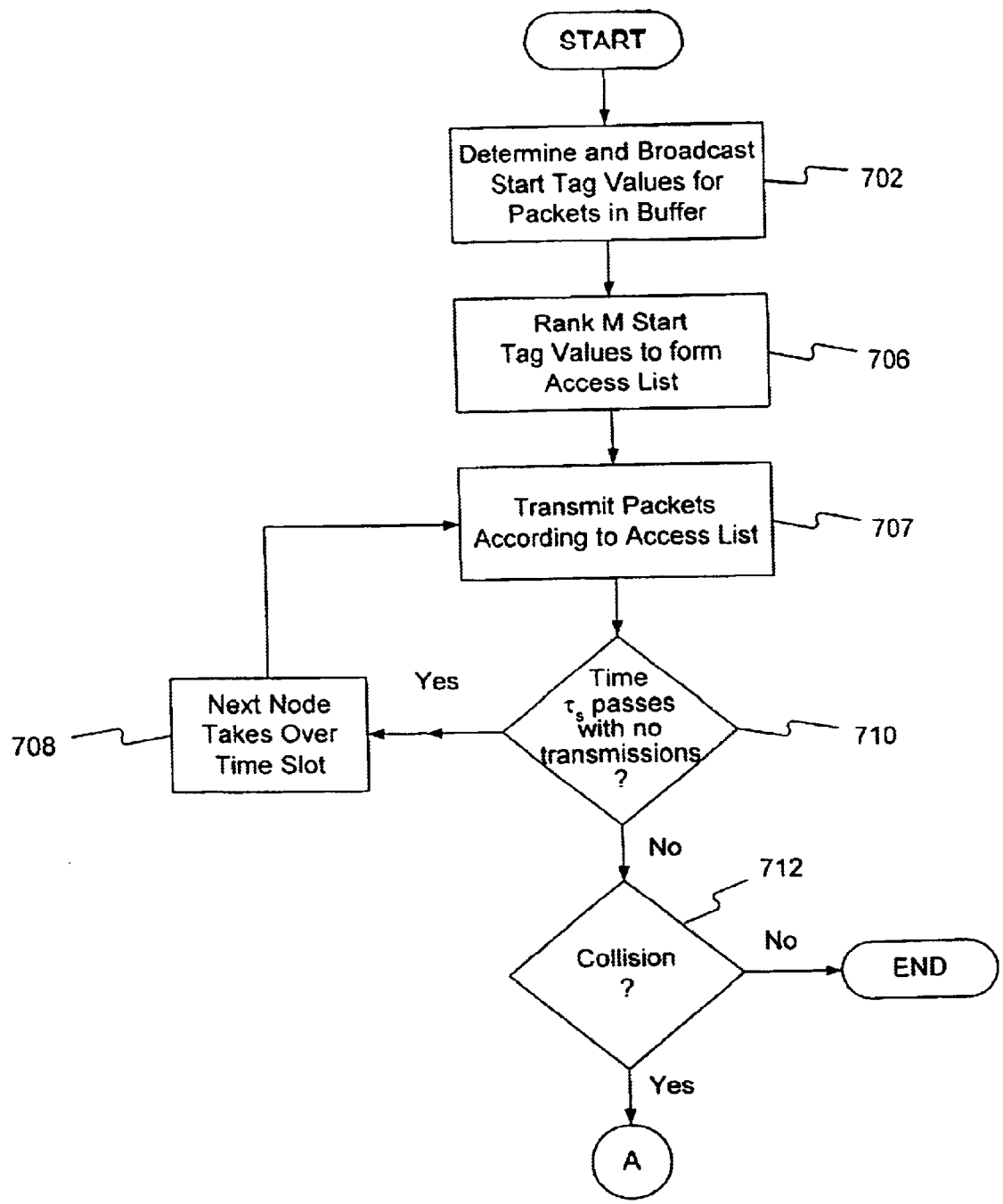
FIGS. 7A and 7B depict a flow chart of a method consistent with this invention for a QoS aware MAC protocol.
Figure 7B:
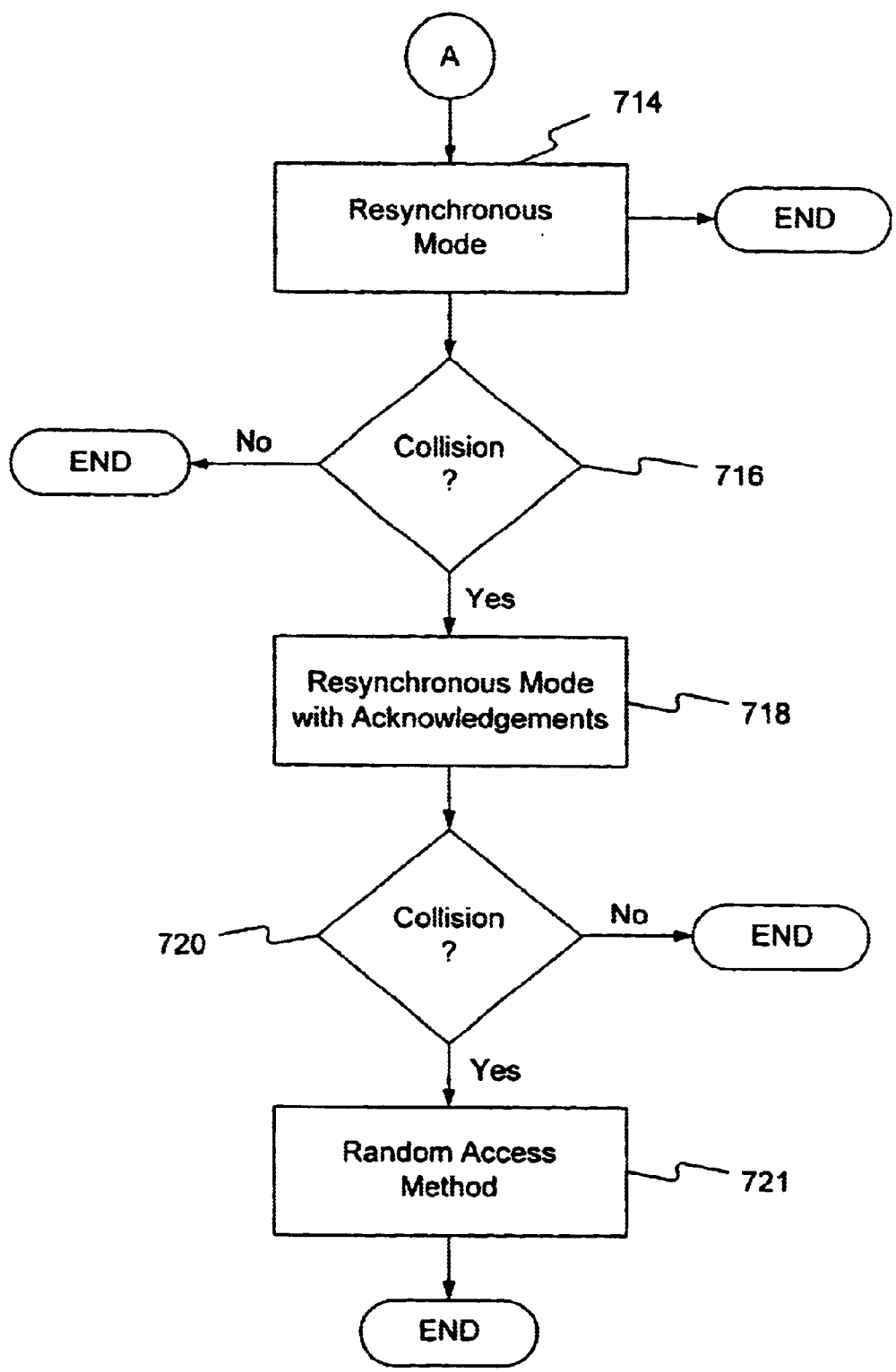

FIGS. 7A and 7B depict a flow chart of a method consistent with this invention for a QoS aware MAC protocol. It is assumed that all the nodes that participate in the protocol are within the transmission range of each other, and that all the traffic originates and terminates within the set of nodes that participate in the protocol. During cycle C, a node generates new packets and places them in a buffer. The node determines the Start Tag values for the packets generated during cycle C. Before the end of cycle C, each node broadcasts the Start Tag values of the packets in their buffers, or of the packets they expect to generate during the next cycle C+1 (step 702). This information can be disseminated by broadcasting control packets during the random access periods, or by piggybacking with other broadcast messages. Each node will broadcast no more than M Start Tag values in a cycle.

In preparation for cycle C+1, each node ranks the smallest M Start Tag values in ascending order, creating an access list (step 706). Thus, each node has an access list that indicates the users of each time slot in the forthcoming cycle C+1 (step 707). Ties are broken according to the IP addresses of the nodes, e.g., nodes with lower IP addresses will have priority over their peers when they have packets with equal Start Tag values. If the total number of broadcast Start Tag values is less than M, then cycle C+1 will consist of a number of time slots less than M. If the number of broadcast Start Tag values is larger than M, then the packets whose Start Tag rankings exceed M will be transmitted in the later cycles. To ensure synchronization of new nodes, those Start Tag values whose rankings exceed M will be broadcast again during cycle C+1, in preparation for cycle C+2. Some of the packets corresponding to the Start Tag values whose rankings exceed M can be transmitted using random access, without having to wait for cycle C+2.

At the beginning of a time slot, if no packets are transmitted in time $\tau_s$ (step 710), then the next node in the access list takes over the time slot (step 708). Other nodes shift their respective position in the access list, and the cycle is shortened accordingly. The packet transmitted at the beginning of the last time slot will be marked so as to indicate the end of that cycle.

If there is a collision at the beginning of a time slot (step 712), that means that at least two nodes have contradicting access lists. Given that all the nodes implement the same protocol, a collision can occur only if a broadcast packet is not received by at least one node. Under the assumption that all the nodes are within the transmission range of each other, and that nodes detect collisions, loss of broadcast data is a rare event. In case of collision (step 712), nodes will enter into a resynchronize mode (step 714). In this mode, there will be a period of time of $\tau_{rs}$ during which nodes will re-broadcast the Start Tag values of their packets. If collision persists (step 716), then nodes will enter into a resynchronize with acknowledgement mode (step 718) of duration $\tau_{rsa}$. In this mode, nodes will participate in the QoS Aware Distributed MAC protocol only if the packet containing their Start Tag values is acknowledged by all the nodes that are known to them. If collisions still persist (step 720), nodes whose packets collide will only use the random access method to transmit (step 721).

A node that is just turned on, or that just arrived to the neighborhood, will wait until it observes the packet that contains the marker indicating the end of the cycle before it broadcasts any Start Tag values. If no such packet is observed within period $\tau_{euc}$, then the node initiates the protocol.

The above protocol may entail a distributed implementation of Start Time Fair Queuing. At the end of each allocated slot, there will be a period of time to allow random access. This period will be used to transmit best effort traffic, as well as changes in the traffic demands. Also, new nodes in the neighborhood will broadcast their traffic demands during that period. Nodes will broadcast new traffic demand information only when there is a change in their traffic profile, or when they realize that the established path cannot support their traffic any longer. When a transit node realizes that it cannot support a flow with QoS requirements, it will inform the originating node using the path information that it already cached. If the originating node cannot be informed, higher layer protocols will be responsible for that task. The updated traffic information will be used for the following cycle.

A cycle has a maximum number of slots, and that number may decrease in proportion to the total traffic in the neighborhood. Each node runs a packet scheduling algorithm such as STQ. Using such a packet scheduling algorithm, nodes allocate the slots among the flows that they support. These flows can be generated, relayed, or terminated by the node. Once they know their share of the slots and the total traffic, nodes can implement a Connection Admission Control (CAC) algorithm for accepting, or rejecting new traffic demands that they receive, or relay to other destinations.

Those skilled in the art recognize that various modifications and variations can be made in the preceding examples without departing from the scope or spirit of the invention. For instance, this invention can be applied to multicast data transmissions, as well as unicast transmissions. Still further, this invention can be applied to terrestrial networks as well as in MANETs.

The description of the invention does not limit the invention. Instead, it provides examples and explanations to allow persons of ordinary skill to appreciate different ways to practice the invention. The following claims define the true scope and spirit of the invention.

What is claimed is:

1. A method for managing data traffic in a network comprised of a plurality of nodes including a first node having at least one neighboring node, the method performed by the first node and comprising:
   determining a value indicative of a maximum unused bandwidth of the first node;
   receiving from the at least one neighboring node data indicative of at least one maximum unused bandwidth of the at least one neighboring node;
   calculating a value indicative of a maximum available bandwidth of the first node from the value indicative of the maximum unused bandwidth of the first node and the received data indicative of the at least one maximum unused bandwidth; and allocating an air time for the first node to transmit data as a function of the maximum available bandwidth of the first node.

2. The computer-readable medium of claim 1, including receiving data during an air time of the at least one neighboring node.

3. The computer-readable medium of claim 2, including calculating a value indicative of a start tag.

4. The computer-readable medium of claim 2, including calculating a value indicative of a finish tag.

5. The method of claim 1, comprising calculating at least one value indicative of the maximum available bandwidth of the at least one neighboring node from the received data.

6. The method of claim 5, including allocating an air time for the first node to transmit data as a function of the maximum available bandwidth of the first node and the at least one maximum available bandwidth of the at least one neighboring node.

7. The method of claim 1, including broadcasting data during the air time according to a packet scheduling algorithm.

8. The method of claim 1, including receiving a route request packet having a requested bandwidth;

comparing the requested bandwidth to the calculated value indicative of the maximum available bandwidth.

9. The method of claim 8, wherein comparing the requested bandwidth includes granting the requested bandwidth if the requested bandwidth is less than or equal to the maximum available bandwidth of the first node.

10. The method of claim 8, wherein comparing the requested bandwidth includes denying the requested bandwidth if the requested bandwidth is greater than the maximum available bandwidth of the first node.

11. The method of claim 1, wherein allocating the air time comprises:

generating a first value indicative of a first packet to be transmitted in the network;

transmitting the first value indicative of the first packet to the plurality of nodes;

receiving a second value indicative of a second packet to be transmitted in the network; and allocating the air time of the first packet based on the first value and the second value.

12. The method of claim 11, wherein the first value indicative of the first packet is a function of an arrival time of the first packet and a length of the first packet, and wherein the second value indicative of the second packet is a function of an arrival time of the second packet and a length of the second packet.

13. The method of claim 11, wherein the first value indicative of the first packet is a function of an estimate of a bandwidth required to support a flow of the first packet, and wherein the second value indicative of the second packet is a function of an estimate of a bandwidth required to support a flow of second the packet.

14. The method of claim 1, comprising broadcasting data indicative of the maximum unused bandwidth of the first node to the at least one neighboring node.

15. The method of claim 14, wherein broadcasting occurs only when the maximum unused bandwidth of the first node changes.

16. The method of claim 1, comprising broadcasting data indicative of the maximum available bandwidth of the first node to the at least one neighboring node.

17. The method of claim 1, comprising receiving data, from the at least one neighboring node, indicative of the maximum available bandwidth of the at least one neighboring node.

18. The method of claim 1, comprising broadcasting data indicative of a maximum bandwidth capacity of the first node to the at least one neighboring node.

19. The method of claim 1, comprising receiving data indicative of at least one maximum bandwidth capacity of the at least one neighboring node.

20. The method of claim 1, including receiving data indicative of at least one maximum bandwidth capacity of at least one node neighboring the at least one neighboring node.

21. The method of claim 1, including receiving data indicative of at least one maximum unused bandwidth of at least one node neighboring the at least one neighboring node.

22. The method of claim 1, wherein the maximum unused bandwidth of the first node is a function of a maximum bandwidth capacity of the first node less a bandwidth of traffic generated at the first node and transit traffic through the first node.

23. The method of claim 22, wherein the maximum available bandwidth of the first node is a function of the maximum unused bandwidth of the first node less a bandwidth of traffic generated at the at least one neighboring node and transit traffic through the at least one neighboring node to a neighbor of the at least one neighboring node.

24. The method of claim 22, wherein the value indicative of the maximum unused bandwidth of the first node is defined by $$MUB = C - \sum_j l_j,$$

where $\forall j \in$ neighborhood of the first node;

MUB is the value indicative of the maximum unused bandwidth of the first node;

C is a value indicative of the maximum bandwidth capacity of the first node; and $l_j$ is a data traffic from the first node to a node j in bits per second.

25. The method of claim 22, wherein the value indicative of the maximum available bandwidth of the first node is defined by $$MAB = MUB - \sum_j \sum_k l_{jk},$$

where $\forall j \in$ neighborhood of the first node;

$\forall k \in$ neighborhood of a node j;

MAB is the value indicative of the maximum available bandwidth of the first node;

MUB is the value indicative of the maximum unused bandwidth of the first node; and $l_{jk}$ is a data traffic from the node j to a node k in bits per second.

26. The method of claim 25, wherein allocating the air time includes allocating the air time in proportion to the maximum bandwidth capacity of the first node minus the maximum available bandwidth of the first node.

27. A network comprising:

a plurality of nodes including a first node having at least one neighboring node;

a receiver in the first node for receiving, from the at least one neighboring node, data indicative of at least one maximum unused bandwidth of the at least one neighboring node;

a memory in the first node containing a program for determining a value indicative of a maximum unused bandwidth of the first node, calculating a value indicative of a maximum available bandwidth of the first node from the value indicative of the maximum unused bandwidth of the first node and the received data indicative of the at least one maximum unused bandwidth, and allocating an air time for the first node to transmit data as a function of the maximum available bandwidth of the first node; and a processor in the first node for running the program.

28. The apparatus of claim 27, wherein the maximum unused bandwidth of the first node is a function of a maximum bandwidth capacity of the first node less a bandwidth of traffic generated at the first node and transit traffic through the first node.

29. The apparatus of claim 28, wherein the maximum available bandwidth of the first node is a function of the maximum unused bandwidth of the first node less a bandwidth of traffic generated at the at least one neighboring node and transit traffic through the at least one neighboring node to a neighbor of the at least one neighboring node.

30. The apparatus of claim 28, wherein the program determines the value indicative of the maximum unused bandwidth of the first node by $$MUB = C - \sum_{j} l_j,$$

where $\forall j \in$ neighborhood of the first node;

MUB is the value indicative of the maximum unused bandwidth of the first node;

C is a value indicative of the maximum bandwidth capacity of the first node; and $l_j$ is a data traffic from the first node to a node j in bits per second.

31. The apparatus of claim 29, wherein the program determines the value indicative of the maximum available bandwidth of the first node by $$MAB = MUB - \sum_{j} \sum_{k} l_{jk},$$

where $\forall j \in$ neighborhood of the first node;

MAB is the value indicative of the maximum available bandwidth of the first node;

$\forall j \in$ neighborhood of a node j;

MUB is value indicative of the maximum unused bandwidth of the first node; and $l_{jk}$ is a data traffic from the node j to a node k in bits per second.

32. The apparatus of claim 31, wherein the program allocates the air time in proportion to the maximum bandwidth capacity of the first node minus the maximum available bandwidth of the first node.

33. The apparatus of claim 27, wherein the program calculates at least one value indicative of the maximum available bandwidth of the at least one neighboring node from the received data.

34. The apparatus of claim 33, wherein the program allocates an air time for the first node to transmit data as a function of the maximum available bandwidth of the first node and the at least one maximum available bandwidth of the at least one neighboring node.

35. The apparatus of claim 27, including a transmitter for broadcasting data during the air time according to a packet scheduling algorithm.

36. The apparatus of claim 27, wherein the receiver receives a route request packet having a requested bandwidth, and wherein the memory contains a program for comparing the requested bandwidth to the calculated value indicative of the maximum available bandwidth.

37. The apparatus of claim 27, wherein the program grants the requested bandwidth if the requested bandwidth is less than or equal to the maximum available bandwidth of the first node.

38. The apparatus of claim 27, wherein the program denies the requested bandwidth if the requested bandwidth is greater than the maximum available bandwidth of the first node.

39. The apparatus of claim 27, comprising a transmitter for broadcasting data indicative of the maximum unused bandwidth of the first node to the at least one neighboring node.

40. The apparatus of claim 39, wherein the transmitter broadcasts only when the maximum unused bandwidth of the first node changes.

41. The apparatus of claim 27, comprising a transmitter for broadcasting data indicative of the maximum available bandwidth of the first node to the at least one neighboring node.

42. The apparatus of claim 27, wherein the receiver receives data, from the at least one neighboring node, indicative of the maximum available bandwidth of the at least one neighboring node.

43. The apparatus of claim 27, comprising a transmitter for broadcasting data indicative of a maximum bandwidth capacity of the first node to the at least one neighboring node.

44. The apparatus of claim 27, wherein the receiver receives data indicative of at least one maximum bandwidth capacity of the at least one neighboring node.

45. The apparatus of claim 27, wherein the receiver receives data indicative of at least one maximum bandwidth capacity of at least one node neighboring the at least one neighboring node.

46. The apparatus of claim 27, wherein the receiver receives data indicative of at least one maximum unused bandwidth of at least one node neighboring the at least one neighboring node.

47. A node having at least one neighboring node, the node comprising:
a receiver for receiving, from the at least one node neighboring node, data indicative of at least one maximum unused bandwidth of the at least one neighboring node;
a memory containing a program for determining a value indicative of a maximum unused bandwidth of the node, calculating a value indicative of a maximum available bandwidth of the node from the value indicative of the maximum unused bandwidth of the node and the received data indicative of the at least one maximum unused bandwidth, and allocating an air time for the node to transmit data as a function of the maximum available bandwidth of the node; and
a processor for running the program.

48. The node of claim 47, wherein the program further generates a first value indicative of a first packet to be transmitted in the network; wherein the node further comprises a transmitter to transmit the first value indicative of the first packet to the at least one neighboring node; wherein the receiver receives a second value indicative of a second packet to be transmitted in the network; and wherein the program allocates the air time of the first packet based on the first value indicative of the first packet and the second value indicative of the second packet.

49. The node of claim 48, wherein the first value indicative of the first packet is a function of an arrival time of the first packet and a length of the first packet, and wherein the second value indicative of the second packet is a function of an arrival time of the second packet and a length of the second packet.

50. The node of claim 48, wherein the first value indicative of the first packet is a function of an estimate of a bandwidth required to support a flow of the first packet, and wherein the second value indicative of the second packet is a function of an estimate of a bandwidth required to support a flow of second the packet.

51. The apparatus of claim 47, wherein the maximum unused bandwidth of the first node is a function of a maximum bandwidth capacity of the first node less a bandwidth of traffic generated at the first node and transit traffic through the first node.

52. The apparatus of claim 51, wherein the maximum available bandwidth of the first node is a function of the maximum unused bandwidth of the first node less a bandwidth of traffic generated at the at least one neighboring node and transit traffic through the at least one neighboring node to a neighbor of the at least one neighboring node.

53. The apparatus of claim 51, wherein the program determines the value indicative of the maximum unused bandwidth of the node by $$MUB = C - \sum_j l_j,$$

where
$\forall j \in$ neighborhood of the first node;
MUB is the value indicative of the maximum unused bandwidth of the node;
C is a value indicative of the maximum bandwidth capacity of the node; and
$l_j$ is a data traffic from the node to a node j in bits per second.

54. The apparatus of claim 52, wherein the program determines the value indicative of the maximum available bandwidth of the node by $$MAB = MUB - \sum_j \sum_k l_{jk},$$

where
$\forall j \in$ neighborhood of the first node;
$\forall k \in$ neighborhood of a node j;
MAB is the value indicative of the maximum available bandwidth of the node;
MUB is the value indicative of the maximum unused bandwidth of the node; and
$l_{jk}$ is a data traffic from the node j to a node k in bits per second.

55. The apparatus of claim 54, wherein the program allocates the air time in proportion to the maximum bandwidth capacity of the node minus the maximum available bandwidth of the node.

56. The apparatus of claim 47, wherein the program calculates at least one value indicative of the maximum available bandwidth of the at least one neighboring node from the received data.

57. The apparatus of claim 56, wherein the program allocates an air time for the node to transmit data as a function of the maximum available bandwidth of the node and the at least one maximum available bandwidth of the at least one neighboring node.

58. The apparatus of claim 47, including
a transmitter for broadcasting data during the air time according to a packet scheduling algorithm.

59. The apparatus of claim 47, wherein the receiver receives a route request packet having a requested bandwidth, and wherein the memory contains a program for comparing the requested bandwidth to the calculated value indicative of the maximum available bandwidth.

60. The apparatus of claim 59, wherein the program grants the requested bandwidth if the requested bandwidth is less than or equal to the maximum available bandwidth of the node.

61. The apparatus of claim 59, wherein the program denies the requested bandwidth if the requested bandwidth is greater than the maximum available bandwidth of the node.

62. The apparatus of claim 47, comprising
a transmitter for broadcasting data indicative of the maximum unused bandwidth of the node to the at least one neighboring node.

63. The apparatus of claim 62, wherein the transmitter broadcasts only when the maximum unused bandwidth of the node changes.

64. The apparatus of claim 47, comprising
a transmitter for broadcasting data indicative of the maximum available bandwidth of the node to the at least one neighboring node.

65. The apparatus of claim 47, wherein the receiver receives data, from the at least one neighboring node, indicative of the maximum available bandwidth of the at least one neighboring node.

66. The apparatus of claim 47, comprising
a transmitter for broadcasting data indicative of a maximum bandwidth capacity of the node to the at least one neighboring node.

67. The apparatus of claim 47, wherein the receiver receives data indicative of at least one maximum bandwidth capacity of the at least one neighboring node.

68. The apparatus of claim 47, wherein the receiver receives data indicative of at least one maximum bandwidth capacity of at least one node neighboring the at least one neighboring node.

69. The apparatus of claim 47, wherein the receiver receives data indicative of at least one maximum unused bandwidth of at least one node neighboring the at least one neighboring node.

70. A method for managing data traffic in a network comprised of a plurality of nodes including a first node having at least one neighboring node, the method comprising:

determining values indicative of a maximum unused bandwidth of the first node and the at least one neighboring node;

calculating a value indicative of a maximum available bandwidth of the first node from the values indicative of a maximum unused bandwidth of the first node and the at least one neighboring node; and allocating an air time for the first node to transmit data as a function of the maximum available bandwidth of the node.

71. The method of claim 70, including receiving data indicative of at least one maximum bandwidth capacity of at least one node neighboring the at least one neighboring node.

72. The method of claim 70, including receiving data indicative of at least one maximum unused bandwidth of at least one node neighboring the at least one neighboring node.

73. The method of claim 70, wherein the maximum unused bandwidth of the first node is a function of a maximum bandwidth capacity of the first node less a bandwidth of traffic generated at the first node and transit traffic through the first node.

74. The method of claim 73, wherein the maximum available bandwidth of the first node is a function of the maximum unused bandwidth of the first node less a bandwidth of traffic generated at the at least one neighboring node and transit traffic through the at least one neighboring node to a neighbor of the at least one neighboring node.

75. The method of claim 73, wherein the value indicative of the maximum unused bandwidth of the first node is defined by $$MUB = C - \sum_j l_j,$$

where $\forall j \in$ neighborhood of the first node;

MUB is the value indicative of the maximum unused bandwidth of the first node;

C is a value indicative of the maximum bandwidth capacity of the first node; and $l_j$ is a data traffic from the first node to a node j in bits per second.

76. The method of claim 74, wherein the value indicative of the maximum available bandwidth of the first node is defined by $$MAB = MUB - \sum_j \sum_k l_{jk},$$

where $\forall j \in$ neighborhood of the first node;

$\forall k \in$ neighborhood of a node j;

MAB is the value indicative of the maximum available bandwidth of the first node;

MUB is the value indicative of the maximum unused bandwidth capacity of the first node; and $l_{jk}$ is a data traffic from the node j to a node k in bits per second.

77. The method of claim 76, wherein allocating the air time includes allocating the air time in proportion to the maximum bandwidth capacity of the first node minus the maximum available bandwidth of the first node.

78. The method of claim 70, comprising calculating at least one value indicative of the maximum available bandwidth of the at least one neighboring node from the received data.

79. The method of claim 78, including allocating an air time for the first node to transmit data as a function of the maximum available bandwidth of the first node and the at least one maximum available bandwidth of the at least one neighboring node.

80. The method of claim 70, including broadcasting data during the air time according to a packet scheduling algorithm.

81. The method of claim 70, including receiving a route request packet having a requested bandwidth;

comparing the requested bandwidth to the calculated value indicative of the maximum available bandwidth.

82. The method of claim 81, wherein comparing the requested bandwidth includes granting the requested bandwidth if the requested bandwidth is less than or equal to the maximum available bandwidth of the first node.

83. The method of claim 81, wherein comparing the requested bandwidth includes denying the requested bandwidth if the requested bandwidth is greater than the maximum available bandwidth of the first node.

84. The method of claim 70, comprising broadcasting data indicative of the maximum unused bandwidth of the first node to the at least one neighboring node.

85. The method of claim 84, wherein broadcasting occurs only when the maximum unused bandwidth of the first node changes.

86. The method of claim 70, comprising broadcasting data indicative of the maximum available bandwidth of the first node to the at least one neighboring node.

87. The method of claim 70, comprising receiving data, from the at least one neighboring node, indicative of the maximum available bandwidth of the at least one neighboring node.

88. The method of claim 70, comprising broadcasting data indicative of a maximum bandwidth capacity of the first node to the at least one neighboring node.

89. The method of claim 70, comprising receiving data indicative of at least one maximum bandwidth capacity of the at least one neighboring node.

90. A computer-readable medium containing instructions for controlling a system to perform a method for managing data traffic in a network comprised of a plurality of nodes including a first node having at least one neighboring node, the method performed by the first node and comprising:
  determining a value indicative of a maximum unused bandwidth of the first node;
  receiving from the at least one neighboring node data indicative of at least one maximum unused bandwidth of the at least one neighboring node;
  calculating a value indicative of a maximum available bandwidth of the first node from the value indicative of the maximum unused bandwidth of the first node and the received data indicative of the at least one maximum unused bandwidth; and
  allocating an air time for the first node to transmit data as a function of the maximum available bandwidth of the first node.

91. The computer-readable medium of claim 90, wherein the maximum unused bandwidth of the first node is a function of a maximum bandwidth capacity of the first node less a bandwidth of traffic generated at the first node and transit traffic through the first node.

92. The computer-readable medium of claim 91, wherein the value indicative of the maximum unused bandwidth of the first node is defined by $$MUB = C - \sum_j l_j,$$

where
  $\forall j \in$ neighborhood of the first node;
  MUB is the value indicative of the maximum unused bandwidth of the first node;
  C is a value indicative of the maximum bandwidth capacity of the first node; and
  $l_j$ is a data traffic from the first node to a node j in bits per second.

93. The computer-readable medium of claim 91, wherein the maximum available bandwidth of the first node is a function of the maximum unused bandwidth of the first node less a bandwidth of traffic generated at the at least one neighboring node and transit traffic through the at least one neighboring node to a neighbor of the at least one neighboring node.

94. The computer-readable medium of claim 93, wherein the value indicative of the maximum available bandwidth of the first node is defined by $$MAB = MUB - \sum_j \sum_k l_{jk},$$

where
  $\forall j \in$ neighborhood of the first node;
  $\forall k \in$ neighborhood of a node j;
  MAB is the value indicative of the maximum available bandwidth;
  MUB is a value indicative of a maximum unused bandwidth of the first node; and
  $l_{jk}$ is a data traffic from the node j to a node k in bits per second.

95. The computer-readable medium of claim 94, wherein allocating the air time includes
  allocating the air time in proportion to the maximum bandwidth capacity of the first node minus the maximum available bandwidth of the first node.

96. The computer-readable medium of claim 90, comprising
  calculating at least one value indicative of the maximum available bandwidth of the at least one neighboring node from the received data.

97. The computer-readable medium of claim 96, including
  allocating an air time for the first node to transmit data as a function of the maximum available bandwidth of the first node and the at least one maximum available bandwidth of the at least one neighboring node.

98. The computer-readable medium of claim 90, including broadcasting data during the air time according to a packet scheduling algorithm.

99. The computer-readable medium of claim 90, including
  receiving a route request packet having a requested bandwidth;
  comparing the requested bandwidth to the calculated value indicative of the maximum available bandwidth.

100. The computer-readable medium of claim 99, wherein comparing the requested bandwidth includes
  granting the requested bandwidth if the requested bandwidth is less than or equal to the maximum available bandwidth of the first node.

101. The computer-readable medium of claim 99, wherein comparing the requested bandwidth includes
  denying the requested bandwidth if the requested bandwidth is greater than the maximum available bandwidth of the first node.

102. The computer-readable medium of claim 90, comprising
  broadcasting data indicative of the maximum unused bandwidth of the first node to the at least one neighboring node.

103. The computer-readable medium of claim 102, wherein broadcasting occurs only when the maximum unused bandwidth of the first node changes.

104. The computer-readable medium of claim 90, comprising
  broadcasting data indicative of the maximum available bandwidth of the first node to the at least one neighboring node.

105. The computer-readable medium of claim 90, comprising
  receiving data, from the at least one neighboring node, indicative of the maximum available bandwidth of the at least one neighboring node.

106. The computer-readable medium of claim 90, comprising
  broadcasting data indicative of a maximum bandwidth capacity of the first node to the at least one neighboring node.

107. The computer-readable medium of claim 90, comprising
  receiving data indicative of at least one maximum bandwidth capacity of the at least one neighboring node.

108. The computer-readable medium of claim 90, including
  receiving data indicative of at least one maximum bandwidth capacity of at least one node neighboring the at least one neighboring node.

109. The computer-readable medium of claim 90, including
  receiving data indicative of at least one maximum unused bandwidth of at least one node neighboring the at least one neighboring node.

110. A method of managing data traffic in a network comprised of a plurality of nodes, the method comprising:

generating a first value indicative of a first packet to be transmitted in the network;

transmitting the first value to the plurality of nodes;

receiving a second value indicative of a second packet to be transmitted in the network; and determining an order of transmission of the first and second packets based on the first value and the second value, wherein the first value is a function of an arrival time of the first packet and a length of the first packet, and wherein the second value is a function of an arrival time of the second packet and a length of the second packet.

111. The method of claim 110, wherein the first value is a function of an estimate of a bandwidth required to support a flow of the first packet, and wherein the second value is a function of an estimate of a bandwidth required to support a flow of second the packet.

112. The method of claim 110, further comprising transmitting the second value to the plurality of nodes.

113. The method of claim 110, further comprising detecting a collision and, if a collision is detected, repeating the steps of generating, transmitting, receiving, and determining.

114. The method of claim 110, further comprising transmitting the first and the second packet in the determined order.

115. The method of claim 114, further comprising detecting a collision and, if a collision is detected, repeating the steps of generating, transmitting, receiving, and determining.

116. A node having at least one neighboring node, the node comprising:

a processor to generate a first value indicative of a first packet to be transmitted in the network;

a transmitter to transmit the first value to the at least one neighboring node; and a receiver to receive a second value indicative of a second packet to be transmitted in the network;

wherein the processor determines an order of transmission of the first and second packets based on the first value and the second value, wherein the first value is a function of an arrival time of the first packet and a length of the first packet, and wherein the second value is a function of an arrival time of the second packet and a length of the second packet.

117. The node of claim 116, wherein the first value is a function of an arrival time of the first packet and a length of the first packet, and wherein the second value is a function of an arrival time of the second packet and a length of the second packet.

118. The node of claim 116, wherein the first value is a function of an estimate of a bandwidth required to support a flow of the first packet, and wherein the second value is a function of an estimate of a bandwidth required to support a flow of second the packet.

119. The node of claim 116, wherein the transmitter transmits the first packet according to the determined order.

120. The node of claim 119, wherein the receiver detects a collision and, if a collision is detected, the processor regenerates the first value, the transmitter retransmits the first value to the at least one neighboring node, the receiver re-receives the second value, and the processor re-determines the order of transmission of the first and second packets based on the first value and the second value.

* * * * *